(12) United States Patent
Schuetz et al.

(10) Patent No.: US 8,716,516 B2
(45) Date of Patent: May 6, 2014

(54) METHOD FOR PRODUCING POLYALKYLENE GLYCOLDI(METH)ACRYLATES

(75) Inventors: Thorben Schuetz, Seeheim-Jugenheim (DE); Joachim Knebel, Alsbach-Haehnlein (DE); Mario Gomez Andreu, Pfungstadt (DE)

(73) Assignee: Evonik Röhm GmbH, Darmstadt (DE)

( * ) Notice: Subject to any disclaimer, the term of this patent is extended or adjusted under 35 U.S.C. 154(b) by 540 days.

(21) Appl. No.: 12/992,998

(22) PCT Filed: May 5, 2009

(86) PCT No.: PCT/EP2009/055368
§ 371 (c)(1),
(2), (4) Date: Nov. 16, 2010

(87) PCT Pub. No.: WO2010/003710
PCT Pub. Date: Jan. 14, 2010

(65) Prior Publication Data
US 2011/0082314 A1  Apr. 7, 2011

(30) Foreign Application Priority Data
Jul. 7, 2008  (DE) .......... 10 2008 040 214

(51) Int. Cl.
*C08G 65/00*  (2006.01)

(52) U.S. Cl.
USPC .......... 560/209; 560/205

(58) Field of Classification Search
None
See application file for complete search history.

(56) References Cited

U.S. PATENT DOCUMENTS

| | | |
|---|---|---|
| 5,563,183 A | 10/1996 | Nunez et al. |
| 5,792,821 A | 8/1998 | Bowen |
| 5,910,551 A | 6/1999 | Bowen |
| 5,929,131 A | 7/1999 | Bowen |
| 5,981,740 A | 11/1999 | Bowen |
| 6,180,739 B1 | 1/2001 | Bowen |
| 7,005,143 B2 | 2/2006 | Abuelyaman et al. |
| 7,405,321 B2 | 7/2008 | Riegel et al. |
| 7,629,411 B2 | 12/2009 | Becker et al. |
| 2002/0127383 A1 | 9/2002 | Wang et al. |
| 2006/0122298 A1 | 6/2006 | Menon et al. |
| 2008/0275166 A1 | 11/2008 | Becker et al. |

FOREIGN PATENT DOCUMENTS

| | | | |
|---|---|---|---|
| CN | 101052661 A | 10/2007 | |
| JP | 2003-193032 | 7/2003 | |
| JP | 2003-533531 | 11/2003 | |
| JP | 2008-522001 | 6/2006 | |
| JP | 2006-527179 | 11/2006 | |
| JP | 2007-008828 | 1/2007 | |
| JP | 2008-511713 | 4/2008 | |
| WO | 00 42085 | 7/2000 | |
| WO | WO2006024538 | * 9/2006 | .............. C04B 24/28 |

OTHER PUBLICATIONS

Chinese Office Action issued May 3, 2012, in Patent Application No. 200910151390.1 (with English-language translation).
International Search Reqport issued Jul. 16, 2009 in PCT/EP09/055368 filed May 5, 2009.
Japanese Office Action issued Oct. 21, 2013, in corresponding Japanese Patent Application No. 2011-517048 (English-language Translation only).

* cited by examiner

*Primary Examiner* — Yevegeny Valenrod
(74) *Attorney, Agent, or Firm* — Oblon, Spivak, McClelland, Maier & Neustadt, L.L.P.

(57) ABSTRACT

The present invention relates to a process for preparing polyalkylene glycol di(meth)acrylates by reacting polyalkylene glycol with (meth)acrylic anhydride, wherein the reaction mixture contains at most 0.5% by weight of metal compounds and/or amines, the reaction is carried out in the presence of polymerization inhibitors and the reaction temperature is at least 60° C.

16 Claims, No Drawings

METHOD FOR PRODUCING POLYALKYLENE GLYCOLDI(METH)ACRYLATES

The present invention relates to a process for preparing polyalkylene glycol di(meth)acrylates.

Polyalkylene glycol di(meth)acrylates are frequently used as comonomers. Accordingly, various methods of obtaining these compounds are known.

For example, these compounds can be obtained by reacting polyalkylene glycols with methyl (meth)acrylate. Different catalysts can be used to improve the yield and the selectivity of the reaction.

For example, publication DE 28 05 702 describes the preparation of esters of unsaturated carboxylic acids. To catalyse the reaction described, it is possible to use especially compounds which contain zirconium and/or calcium. The particularly suitable catalysts include especially zirconium acetylacetonate. The preparation of 1,3-butanediol dimethacrylate is described explicitly. The reactions lead to high yields of approx. 97% based on the alcohol used. However, a disadvantage is that the catalyst is relatively expensive and can be removed from the reaction mixture only with very great difficulty.

A process for removing this catalyst is detailed in DE 199 40 622, but the process is relatively expensive to perform.

In addition, it is possible to use acids or bases in order to catalyse the transesterification. Such reactions are detailed, for example, in CN 1355161, DE 34 23 443 or EP-A-0 534 666. When these catalysts are used, however, side reactions have to be expected, for example the Michael addition, which reduces both the purity of the desired dimethacrylate and the yield.

In addition, polyalkylene glycol di(meth)acrylate can be obtained by reacting polyalkylene glycol with (meth)acrylic anhydride. These reactions are described, for example, in U.S. Pat. No. 5,563,183 and EP 670 341. According to the publication U.S. Pat. No. 5,563,183, a catalyst has to be used for this reaction, and this reaction is effected in a solvent. According to the teaching of the document EP 670 341, the use of a catalyst is associated with advantages. In the examples of this publication, the reaction is performed using a catalyst at a temperature of approx. 25 to 55° C.

The use of catalysts or solvents in order to keep the reaction temperatures low is, however, associated with disadvantages. For instance, the catalysts have to be removed in many cases after the reaction in order to obtain a product which satisfies the elevated demands. The removal of these constituents of the reaction mixture is additionally associated with costs. Furthermore, in the case of use of solvents, an increased reaction volume is needed, which leads to an increased capital requirement in a plant for preparing polyalkylene glycol di(meth)acrylates.

In the light of the prior art, it was thus an object of the present invention to provide a process for preparing polyalkylene glycol di(meth)acrylates, in which the product can be obtained very inexpensively. Furthermore, the resulting polyalkylene glycol di(meth)acrylate should contain only very small amounts of by-products and catalyst residues.

It was a further object of the invention to provide a process in which polyalkylene glycol di(meth)acrylate can be obtained very selectively. At the same time, the compositions obtainable by the present process should be convertible without any problem in further process steps, without any need for a complicated purification.

It was additionally an object of the present invention to provide processes for preparing polyalkylene glycol di(meth) acrylate which can be carried out in a simple and inexpensive manner. At the same time, the product should, as far as possible, be obtained in high yields and, viewed overall, with low energy consumption.

These objects and further objects which are not stated explicitly but which are immediately derivable or discernible from the connections discussed herein by way of introduction are solved by processes having all features of Claim 1. Appropriate modifications to the processes according to the invention are protected in the dependant claims referring back to Claim 1.

The present invention accordingly provides a process for preparing polyalkylene glycol di(meth)acrylates by reacting polyalkylene glycol with (meth)acrylic anhydride, characterized in that the reaction mixture contains at most 0.5% by weight of metal compounds and/or amines, the reaction is carried out in the presence of polymerization inhibitors and the reaction temperature is at least 60° C.

It is thus possible in an unforeseeable manner to provide a process for preparing polyalkylene glycol di(meth)acrylate in which the product is obtained very inexpensively. Surprisingly, the product obtained contains only very small amounts of by-products, and generally no catalyst residues are present in the product mixture. Accordingly, a composition obtainable by the present process can be converted without any problem in further process steps, without any need for a complicated purification.

In addition, the process according to the invention enables a particularly selective preparation of polyalkylene glycol di(meth)acrylates.

Furthermore, the process according to the invention can be performed in a simple and inexpensive manner, the product being obtainable in high yields and, viewed overall, with low energy consumption.

According to the invention, polyalkylene glycol di(meth) acrylates are prepared, the expression "(meth)acrylate" representing methacrylate, acrylate and mixtures of methacrylates and acrylates. Polyalkylene glycol di(meth)acrylates are widely known per se, these compounds deriving from polyalkylene glycols which have two reactive hydroxyl groups.

To prepare polyalkylene glycol di(meth)acrylate, according to the invention, at least one polyalkylene glycol with two reactive hydroxyl groups is used. The weight-average molecular weight of the polyalkylene glycol is preferably in the range from 500 to 20000 g/mol, more preferably in the range from 1000 to 10000 g/mol.

The preferred polyalkylene glycols include especially poly-$C_2$-$C_4$-alkylene glycol compounds. Poly-$C_2$-$C_4$-alkylene glycol compounds, which are variously also referred to as poly-$C_2$-$C_4$-alkylene oxides or poly(oxy-$C_2$-$C_4$-alkylene) compounds, are understood to mean oligomeric or macromolecular polyethers having a plurality of, generally at least 3, frequently at least 5 and especially at least 10, and generally not more than 500, frequently not more than 400, for example from 10 to 300 and especially from 10 to 200, repeat units which are derived from $C_2$-$C_4$-alkylene glycols. These compounds may be linear or branched and generally have an average of at least two free OH groups in the molecule.

Preference is given to linear poly-$C_2$-$C_4$-alkylene glycol compounds with about two free OH groups per molecule (i.e. about 1.9 to 2.1 free OH groups on average). Such compounds can be described by the general formula P:

$$\text{HO-(A-O)}_n\text{—H} \tag{P}$$

in which n specifies the number of repeat units and is generally a number in the range from 3 to 500, especially in the range from 5 to 400, more preferably in the range from 10 to 300 and most preferably in the range from 10 to 200, and A is $C_2$-$C_4$-alkylene such as 1,2-ethanediyl, 1,3-propanediyl, 1,2-propanediyl, 1,2-butanediyl or 1,4-butanediyl.

The process according to the invention is especially suitable for preparing (poly-$C_2$-$C_4$-alkylene glycol) di(meth)acrylates in which at least 50% by weight, preferably at least 70% by weight, in particular at least 90% by weight and especially all of the repeat units in the poly-$C_2$-$C_4$-alkylene glycol compound P used are derived from ethylene glycol or from ethylene oxide. Accordingly, preferably at least 50% by weight, in particular at least 70% by weight, even more preferably at least 90% by weight and especially all of the A-O units in formula P are $CH_2$—$CH_2$—O. In a further preferred embodiment of the present invention, at least 50% by weight, preferably at least 70% by weight, in particular at least 90% by weight and especially all of the repeat units in the poly-$C_2$-$C_4$-alkylene glycol compound P used are derived from propylene glycol or propylene oxide.

According to the present invention, polyalkylene glycol is reacted with (meth)acrylic anhydride. Particular preference is given to using especially methacrylic anhydride, which has the CAS number 760-93-0.

The molar ratio of (meth)acrylic anhydride to polyalkylene glycol may preferably be in the range from 4:1 to 2:1, more preferably in the range from 3:1 to 2.1:1. Based on the proportion of hydroxyl groups to be converted, this gives a molar ratio of 2:1 to 1:1, more preferably 1.5:1 to 1.05:1, of (meth)acrylic anhydride to OH groups of the polyalkylene glycol.

The reaction can be effected under elevated or reduced pressure. In a particularly appropriate modification of the present invention, the transesterification can be carried out at a pressure in the range from 200 to 2000 mbar, more preferably in the range from 500 to 1300 mbar.

According to the invention, the reaction temperature is at least 60° C. In a preferred embodiment of the present invention, the reaction is effected preferably at a temperature in the range from 70° C. to 120° C., more preferably in the range from 80° C. to 100° C.

According to the invention, the proportion of metal compounds or amines is limited to 0.5% by weight, more preferably 0.05% by weight, based on the reaction mixture. In a particular aspect, no metal compound or no amine is present in the reaction mixture.

These figures are based on soluble components. Metal compounds and/or amines typically catalyse the reactions of (meth)acrylic anhydride with hydroxyl groups of polyalkylene glycols. Accordingly, such catalysts are not needed for the present process. Metal compounds and amines are known in the technical field and are described, for example, in Ullmanns Encyclopedia of Industrial Chemistry (6th Edition), Verlag Wiley-VCH, Weinheim 2003 or Römpp Chemielexikon, 2nd Edition on CD-ROM. The metal compounds include especially salts, for example halides, hydroxides or oxides of alkali metals, such as LiOH, KOH, or zirconium compounds. The amines include, for example, ammonia, triethylamine, tributylamine and the like.

According to the invention, polymerization inhibitors are used in the reaction. These compounds, for example hydroquinones, hydroquinone ethers such as hydroquinone monomethyl ether or di-tert-butylpyrocatechol, phenothiazine, 4-hydroxy-2,2,6,6-tetramethylpiperidine 1-oxyl, methylene blue or sterically hindered phenols, for example 2,4-dimethyl-6-tert-butylphenol, are widely known in the technical field. These compounds can be used individually or in the form of mixtures and are generally commercially available. For further details, reference is made to the customary technical literature, especially to the Römpp-Lexikon Chemie; editors: J. Falbe, M. Regitz; Stuttgart, New York; 10th Edition (1996); under "Antioxidants" and the references cited in this entry.

Preference is given to using especially phenols as polymerization inhibitors. Particularly surprising advantages can be achieved in the case of use of mixtures which contain hydroquinone monomethyl ether and/or 2,4-dimethyl-6-tert-butylphenol. The molar ratio of hydroquinone monomethyl ether to 2,4-dimethyl-6-tert-butylphenol here is more preferably in the range from 2:1 to 1:2. Based on the weight of the overall reaction mixture, the proportion of inhibitors, individually or as a mixture, may generally be 0.01-0.5% (wt/wt).

These polymerization inhibitors can be added to the reaction mixture before or at the start of the reaction. In addition, it is also possible to add portions of the polymerization inhibitors added during the reaction.

The reaction can preferably be brought about in the presence of oxygen, especially atmospheric oxygen.

The reaction can be carried out either continuously or batchwise. The process according to the invention can be carried out in bulk, i.e. without use of a further solvent. If desired, it is also possible to use an inert solvent. These include petroleum, benzene, toluene, n-hexane, cyclohexane and methyl isobutyl ketone (MIBK), methyl ethyl ketone (MEK). Particular advantages, especially with regard to the purification of the products and the product purity, can be achieved if the reaction mixture used comprises at least 90% by weight of polyalkylene glycol and (meth)acrylic anhydride, more preferably at least 95% by weight of polyalkylene glycol and (meth)acrylic anhydride. Therefore, in this preferred embodiment of the process according to the invention, only small amounts of solvent, more preferably no solvents, are used.

In a particularly appropriate variant of the inventive transesterification, all components, for example the polyalkylene glycol, the (meth)acrylic anhydride and the polymerization inhibitor, are mixed, and this reaction mixture is then heated in the presence of atmospheric oxygen to at least 60° C., preferably about 80 to 100° C. The reaction times depend upon factors including the parameters selected, for example pressure and temperature. They are, however, generally in the range from 1 to 24 hours, preferably from 2 to 20 hours and most preferably 4 to 8 hours. In continuous processes, the residence times are generally in the range from 0.5 to 24 hours, preferably from 1 to 12 hours and most preferably 4 to 8 hours. Further information in relation to the reaction times can be taken by the person skilled in the art from the example adduced.

The reaction can preferably take place with stirring, in which case the stirrer speed may more preferably be in the range from 50 to 2000 rpm, most preferably in the range from 100 to 500 rpm.

The pH may be within a wide range. However, (meth)acrylic acid is formed in the reaction, which, owing to the low content of metal compounds, leads to a lowering of the pH. Appropriately, the reaction can be carried out at a pH in the range from 0 to 8, preferably 2 to 7, this value being measured using a sample of the reaction mixture mixed with a 10-fold excess of water.

A suitable plant for performing the present transesterification may comprise, for example, a stirred tank reactor with a stirrer and vapour heater. Such plants are known per se and are described, for example, in Ullmanns Encyclopedia of Industrial Chemistry (6th Edition), Verlag Wiley-VCH, Weinheim 2003, Volume 10, page 647. The size of the plants depends on the amount of polyalkylene glycol di(meth)acrylate to be prepared, and the present process can be performed either on the laboratory scale or on the industrial scale. In a particular aspect, the stirred tank reactor may accordingly have a tank volume in the range from 1 m³ to 30 m³, preferably 3 m³ to 20 m³. The stirrer of the stirred tank may especially be configured in the form of an anchor stirrer, impeller, paddle stirrer or Inter-MIG stirrer.

The (meth)acrylic acid present in the reaction mixture or a salt of this acid may in many cases remain in the resulting reaction mixture without this having an adverse effect for the polymers obtainable therefrom. According to the end use of the polymers, the (meth)acrylic acid obtained can also be removed from the reaction mixture by extraction processes.

After the reaction has ended, excess (meth)acrylic anhydride is in many cases removed from the reaction mixture. To this end, it is possible to use water, for example, in which case the pH is preferably adjusted such that the (meth)acrylic acid present in the reaction mixture is deprotonated.

In a preferred modification of the process according to the invention, the weight ratio of reaction mixture to be worked up and water is in the range from 5:1 to 1:5, more preferably 2:1 to 1:2. Advantageously, the pH of the aqueous phase can be adjusted to a value greater than or equal to 4.5, the pH of the aqueous phase preferably being in the range from 5 to 8, more preferably in the range from 5.5 to 7.

In this case, water can be added first. After the water has been added, the pH of the aqueous phase can then be adjusted to the aforementioned values.

The water can be added at the reaction temperature or after cooling the reaction mixture. Surprising advantages with regard to the product purity can be achieved by adding the water at a temperature in the range from 20 to 70° C., preferably 40 to 60° C. The pH can preferably be adjusted at a temperature in the range from 10 to 60° C., more preferably 20 to 50° C.

It is surprisingly possible through these measures to obtain an easy-to-handle starting mixture for preparing polymers. The aqueous solution thus obtained exhibits no explosion risk, and so it can be transported particularly easily.

The aqueous compositions obtainable by the present process can in many cases be used without removing the (meth) acrylic acid released. In addition, the (meth)acrylic acid released can be removed from the composition. The polyalkylene glycol di(meth)acrylate obtained in each case frequently already meets the high requirements detailed above, and so further purification is frequently unnecessary. To further enhance the quality, the mixture obtained can be purified by known processes.

In one configuration of the process according to the invention, the resulting product mixture can be purified by filtration processes. These processes are known from the prior art (W. Gösele, Chr. Alt in Ullmann's Encyclopedia of Industrial Chemistry, (6th Edition), Verlag Wiley-VCH, Weinheim 2003, Volume 13, pages 731 and 746), and it is possible to use customary filtration aids, for example bleaching earth and aluminium silicates (perlite). For example, it is possible to use, inter alia, continuously operable filters for a topcoat filtration.

The applications which do not require removal of the (meth)acrylic acid released include especially swellable polymers which can be used, inter alia, for sealing pipelines or built structures, or to form water-impervious ground layers. These applications are detailed, inter alia, in EP 0 376 094, JP 02-206657, JP 2003193032 A and EP 0 470 008 A1.

An aqueous composition obtained in accordance with the invention can be used in an aqueous polymerization to obtain sealants with a surprisingly high swellability. An improved swellability is surprisingly exhibited by polymers which are obtainable by polymerizing a composition which contains at least one polyalkylene glycol di(meth)acrylate having a weight-average molecular weight greater than 2500 g/mol, preferably in the range from 2500 to 10000 g/mol, more preferably greater than 5000 g/mol, especially greater than 6000 g/mol. The molecular weight can be determined in a manner known per se by gel permeation (GPC) or light scattering. Determination by means of GPC has been found to be particularly useful.

The polymer may optionally have further comonomer units. Preference is given to polymers which are obtainable by copolymerization with copolymerizable amines and/or hydroxyalkyl esters. The polymerization is effected preferably using a free-radical-forming initiator at temperatures in the range from 0° C. to 100° C. Preference is given to hardening the composition by adding 1% by weight to 7% by weight, based on the total weight of the composition, of a water-soluble inorganic peroxodisulphate, such as alkali metal or ammonium peroxodisulphate, at temperatures below 0° C., preferably at a temperature of 5° C. to 40° C., within a short time to form a flexible gel. The hardening time is preferably 10 minutes to 1500 minutes, but more preferably less than 1000 minutes. In addition to or instead of peroxodisulphate, it is also possible to use other water-soluble, free-radical-forming initiators such as tert-butyl hydroperoxide in an effective amount, provided that they form a redox system effective at low temperatures together with the tertiary amine.

The present invention will be illustrated hereinafter with reference to an example, without any intention that this should impose a restriction.

EXAMPLE 1

A 500 ml four-neck round-bottomed flask equipped with a sabre stirrer with a stirrer sleeve and stirrer motor, air inlet, bottom thermometer and a jacketed coil condenser was initially charged with 149.3 g (0.019 mol) of polyethylene glycol with a molecular weight of 8000 (PEG 8000), which were melted with stirring. At bottom temperature of approx. 80° C., 8.2 g (0.053 mol) of methacrylic anhydride and a mixture of polymerization inhibitors consisting of 0.158 g (1000 ppm) of hydroquinone monomethyl ether and 0.158 g (1000 ppm) of 2,4-dimethyl-6-tert-butylphenol were added. Subsequently, the mixture was stirred at a bottom temperature of 90° C. for 6 hours. After the reaction time, the still-warm product (90-85° C.) was admixed with 140 g of water and stirred for 0.5 hour (this cools the solution down to approx. 50° C.). The solution was neutralized dropwise with 5.01 g of 40% NaOH solution (pH 6). In order to obtain a 50% solution, another 4.89 g of demineralized water were added, and the mixture was stirred for another 10 min and transferred.

The resulting yield of polyethylene glycol dimethacrylate was 95% based on the polyethylene glycol used.

APPLICATION EXAMPLE 1

A monomer composition comprising 50% by weight of polyethylene glycol dimethacrylate, 30% by weight of acrylic acid and 20% by weight of 2-dimethyl-aminoethyl methacrylate, based in each case on the monomer content, was prepared. The polyethylene glycol used to prepare the polyethylene glycol dimethacrylate had a molecular weight of 8000 g/mol.

The composition was polymerized in bulk in the flat chamber method in chambers formed from glass plates, first at 60°

C. in a water bath for 7 hours and then at 100° C. in a drying cabinet for 18 hours with addition of 0.2% by weight of 2,2'-azobis-isobutyronitrile.

To determine the swelling, a sample was conditioned in a vacuum drying cabinet at 100° C. for 18 hours. After cooling to room temperature, the specimens were weighed and then placed onto stainless steel meshes in clear glass bottles in distilled water (100 ml) in a climate-controlled room at 23° C. At regular intervals, they were taken out, adhering liquid was removed with absorptive paper and the polymer pieces were weighed again. The measurement was continued until the maximum swellability had been attained. The swelling of the polymer used was approx. 239%.

APPLICATION EXAMPLE 2

Application Example 1 was essentially repeated, except that the monomer composition was transferred into an aqueous solution which had a water content of 50% by weight. The polymerization of the aqueous solution was brought about with 1% by weight of ammonium peroxodisulphate and 2% by weight of ethanolamine at room temperature within a period of 500 minutes.

The swelling of the resulting polymer was 367%.

A comparison of these results shows that the use of an aqueous solution leads to surprising advantages with regards to swellability, which is linked to the ability of the polymer to bring about a seal.

The invention claimed is:

1. A process for preparing a polyalkylene glycol di(meth)acrylate by reacting a polyalkylene glycol with a (meth)acrylic anhydride, wherein the reaction mixture comprises no metal compound and no amine, the reaction is carried out in the presence of a polymerization inhibitor and the reaction temperature is at least 60° C.

2. The process according to claim 1, wherein the reaction temperature is in the range from 70° C. to 120° C.

3. The process according to claim 1, wherein the reaction mixture comprises at least 90% by weight of the polyalkylene glycol and the (meth)acrylic anhydride.

4. The process according to claim 3, wherein the reaction mixture consists essentially of the polyalkylene glycol, the (meth)acrylic anhydride and a polymerization inhibitor.

5. The process according to claim 1, wherein the polymerization inhibitor is at least one phenol.

6. The process according to claim 5, wherein the polymerization inhibitor is hydroquinone monomethyl ether and/or 2,4-dimethyl-6-tert-butylphenol.

7. The process according to claim 1, wherein the reaction time is in the range of from 1 hour to 24 hours.

8. The process according to claim 1, wherein the reaction is effected at a pressure in the range of from 500 mbar to 1300 mbar.

9. The process according to claim 1, wherein said process is performed as a batchwise or semibatchwise process.

10. The process according to claim 1, wherein the polyalkylene glycol has a weight-average molecular weight in the range from 1000 to 10000 g/mol.

11. The process according to claim 1, wherein the polyalkylene glycol is polyethylene glycol or polypropylene glycol.

12. The process according to claim 1, wherein the molar ratio of the (meth)acrylic anhydride to the polyalkylene glycol is in the range of from 4:1 to 2:1.

13. The process according to claim 1, wherein at least a portion of the polyalkylene glycol is initially charged and heated to the reaction temperature, and the (meth)acrylic anhydride is added to the heated polyalkylene glycol.

14. The process according to claim 1, wherein the resulting reaction mixture is worked up by adding water.

15. The process according to claim 14, wherein the weight ratio of reaction mixture to be worked up and water is in the range from 5:1 to 1:5.

16. The process according to claim 14, wherein the pH is adjusted to a value greater than or equal to 4.5.

* * * * *